Figure 1:
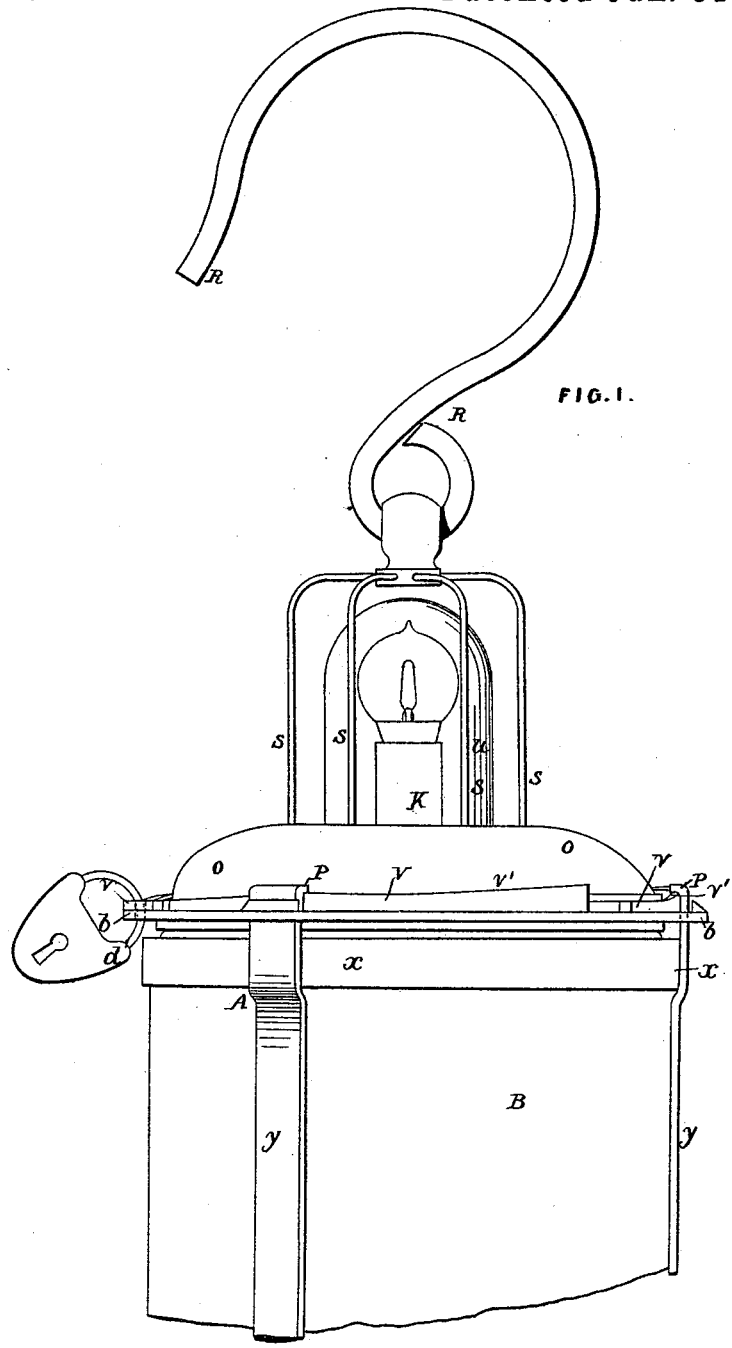

(No Model.) 3 Sheets—Sheet 1.

D. URQUHART & B. NICHOLSON.
GALVANIC BATTERY.

No. 377,340. Patented Jan. 31, 1888.

Witnesses:
C. W. Beckham.
F. E. Tasker.

David Urquhart.
Benjamin Nicholson.
By A. Pollok
their attorney (No Model.) 3 Sheets—Sheet 2.
D. URQUHART & B. NICHOLSON.
GALVANIC BATTERY.
No. 377,340. Patented Jan. 31, 1888.
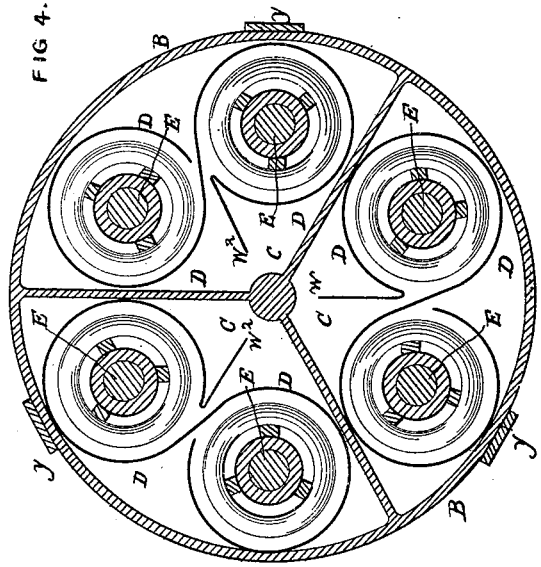
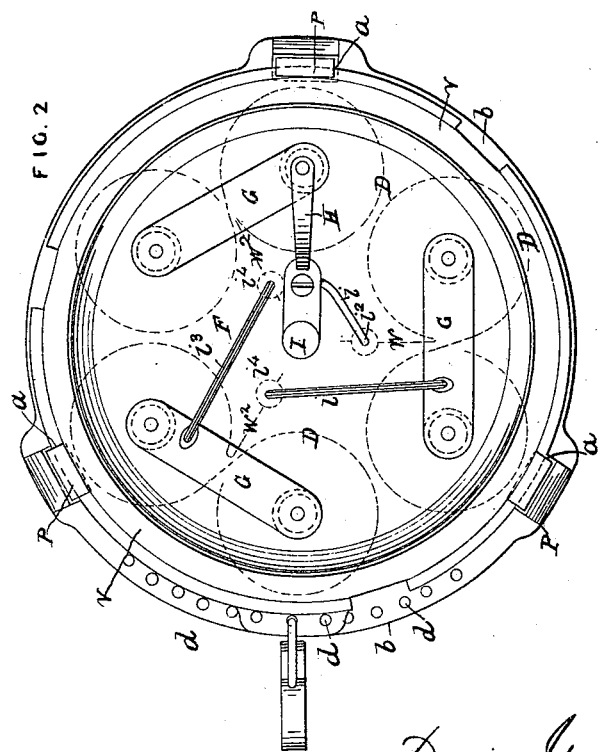
Witnesses:
C. W. Beckham
Jas. K. McGathran
David Urquhart
Benjamin Nicholson
By A. Pollok
their attorney
N. PETERS, Photo-Lithographer, Washington, D. C.

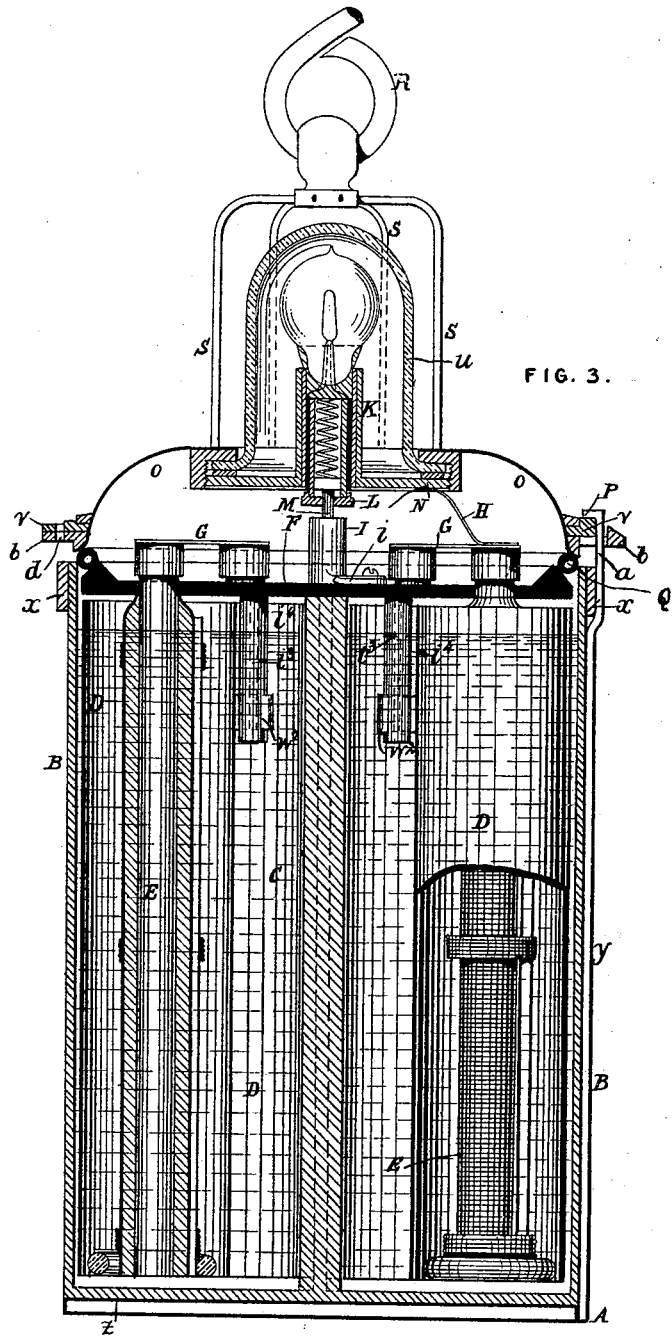

UNITED STATES PATENT OFFICE.

DAVID URQUHART, OF WESTMINSTER, AND BENJAMIN NICHOLSON, OF SOUTH NORWOOD PARK, COUNTY OF SURREY, ASSIGNORS TO THE NEW PORTABLE ELECTRIC LAMP AND POWER SYNDICATE COMPANY, (LIMITED,) OF LONDON, ENGLAND.

GALVANIC BATTERY.

SPECIFICATION forming part of Letters Patent No. 377,340, dated January 31, 1888.

Application filed September 21, 1887. Serial No. 250,336. (No model.) Patented in England May 23, 1887, No. 7,506.

*To all whom it may concern:*

Be it known that we, DAVID URQUHART, electrical engineer, and BENJAMIN NICHOLSON, gentleman, subjects of the Queen of Great Britain and Ireland, and residing, respectively, DAVID URQUHART at No. 4 The Sanctuary, in the city of Westminster, England, and BENJAMIN NICHOLSON at The Torrs, South Norwood Park, in the county of Surrey, England, have jointly invented certain new and useful Improvements in and connected with Electric Batteries and Lamps, suitable for miners' use or for analogous purposes, (for which we have applied for a patent in Great Britain on May 23, 1887, No. 7,506,) of which the following is a specification.

This invention has for its object to provide a battery simple in construction, occupying but a small space in comparison with its power and readily and economically regenerated or put into a condition for renewed work after it has become exhausted.

The invention relates to batteries which may be compactly arranged, as far as the general disposition of the elements and adjuncts adapted to a single-liquid battery are concerned, after the manner illustrated and described under the patent, No. 11,521, dated August 21, 1884, granted to John Henry Johnson as a communication from Philipp George Skrivanou; but this present invention relates to batteries whereof the negative element is coated with or holds chloride of silver, but we may use instead peroxide of silver. When we use chloride of silver, a suitable support therefor is carbon; but when we use peroxide of silver we prefer to make the support of silver or platinum. The positive element may be of zinc, of tin, or of iron, using zinc when we use peroxide of silver for the opposite element. The electrolyte of the battery is either a potassic or sodic hydrate; but when the negative element carries chloride of silver and the positive element is tin we use dilute hydrochloric acid as the electrolyte.

In order to make the battery portable and readily accessible, we prefer to fix all the negative elements (positive pole-plate) to a single plate or carrier, so that they may all be removed at once from the battery. This plate or carrier is preferably of insulite or vulcanite, and forms a cover for the cells, and it may be held in position by a metal cover forced down over it, so that the battery is thereby hermetically sealed. The cover, which carries the negative elements, also carries contact-pieces, which make the connection with the positive elements (negative pole-plates) when the cover is put in place, so that the act of putting on the cover couples up the cells. The lamp may be placed in the metal cover to admit, also, of the contacts for the circuit through the lamp being made on fastening on the cover.

In order to regenerate the negative elements, when they consist of or carry chloride of silver, we remove the said elements from the battery and place them in a bath of hydrochloric acid, or of chloride of sodium, potassium, or zinc; or the bath may consist of or contain the spent liquor of the battery. Through this bath, while the elements to be regenerated are immersed therein, we pass an electric current, using what were the negative elements in the battery as the positive electrodes in the bath, the negative electrodes in the said bath being any conductor usually employed in analogous processes. This latter method is also used in cases where the negative elements consist of or carry peroxide of silver. When the spent liquor is used as the bath, we recover by that means the metal in solution therein, while at the same time we regenerate or reconvert the elements, and obtain an electrolyte fit for reuse in the battery. The construction of the battery gives great facilities for this revivifying process, by reason of the negative elements being connected to a single plate in the manner herein described, which permits them to be easily handled, and the requisite manipulation of the revivifying process being performed with great rapidity and without any danger of the loss of any of the silver.

Where a circular form of the lamp is desired, the chloride or oxide elements may be arranged in pairs, with the zincs surrounding them, either by being made as two cylinders or in S form, with a chloride or oxide element in each loop of the S. These pairs of elements are coupled together, and are situated in one compartment or cell of the battery, of which compartments or cells there are preferably three, separated by radial divisions extending from a central post. The cover of the battery is made of a circular disk of insulating material, to which the elements are attached, the one set terminating in a spring which bears against a metal cover placed over the insulating-cover. This metal cover carries the lamp, which has an insulating material between it and the metallic lamp-stem. The other set of electrodes terminates in a contact-piece, which, when the metal cover is put in place, bears against a spring-contact plunger in the lamp-stem. The terminal wires of the filament of the lamp are respectively in electrical communication with the said spring-contact plunger and the metallic cover which bears on the spring, by which one set of elements is connected. By this means, when the metallic cover is put on and forced down, the lamp-circuit is completed and the lamp lighted. A convenient mode of attaching the metal cover to the battery is to provide it with catch-pieces engaging in slots in a ring on the metal cover of the battery and caused to engage with inclined projections, by which the metal cover is caused to make a tight joint, and at the same time the contacts for lighting the lamps are made. The metal cover may, if desired, be locked to the battery by holes in the rims of each, arranged after the manner of the division of a vernier and scale, so that a slight movement brings the holes opposite each other.

The accompanying drawings represent as an example a circular portable electric lamp constructed according to this invention suitable for miners' use.

Figure 1 is an elevation of the upper portion of the lamp; Fig. 2, a plan with the cover removed; Fig. 3, a sectional elevation, and Fig. 4 a horizontal section through the elements.

A is a metal frame, consisting of a base, $z$, of thin metal, connected by bars or strips $y$ to a ring, $x$, surrounding the upper part of the battery-casing B, thereby constituting a firm support or inclosure for the said battery-casing. The battery-casing is preferably made of vulcanite or like material, and is divided by radial partitions into three cells, C, each containing a set of elements, the positive elements D being preferably S-shaped and containing in each loop thereof the negative elements E. These elements are carried by a disk, F, of vulcanite or other suitable insulating material, forming the cover to the battery. The two negative elements in each cell are electrically connected together by a strip, G, and the several elements are electrically connected in series, as is well understood. A spring, H, connected to one of the strips G constitutes the positive terminal of the battery, while the other terminal consists of a block, I, secured to the center of the disk F, and electrically connected to one of the positive elements by a wire, $i$, passing through a tube, $i^2$, of vulcanite or the like, secured to the cover F, which tube is provided with a slot in which a strip, $w$, from the positive element enters, and in which it is in contact with the wire $i$, leading to the block I. The positive and negative elements are connected in series by a similar arrangement, the wires $i^3$ entering the tubes of vulcanite or the like, $i^4$, where they come into contact with the strips $w^2$ from the positive elements, the other ends of the wires being electrically connected to the strips G. The illuminating portion of the lamp is fitted in a metal socket, K, to which one of the terminal wires of the illuminating-filament is connected, the other terminal wire of the said filament being connected to a plug, L, fitted in the socket K, but insulated therefrom by vulcanite or other suitable material. Through the plug L passes the stem M of a spring-plunger, which, when the lamp is in use, makes electrical contact with terminal I of the battery, the contact with the other terminal to complete the circuit through the lamp being made by the spring H and a metal collar, N, screwed into or onto the metallic cap or cover O of the lamp and in one with or electrically connected to the socket K.

The cover O is secured to the frame A of the lamp by lips or projections P, formed on the upper ends of the bars or strips $y$ of the frame, and passed through notches or openings $a$ in the rim $b$, attached to or formed on the cover O and engaging with another ring, $v$, fitted to turn on the cover, so as to engage beneath the lips P. The ring $v$ is provided with inclines $v'$ on the upper surface, so that by turning the ring beneath the lips or projections P the said inclines forcibly press down the cover toward the disk F without rotating the said cover, between which cover and the disk F is interposed an india-rubber packing-ring, Q, so as to insure a liquid-tight joint at that part.

When the cover O is forced down to the extent required to bring the contacts H N and I M together, the lamp will be lighted, and it may be maintained in this condition by passing a bolt or the loop of a padlock through holes $d$ provided for the purpose in the rings $b$ and $v$ near the edge of the cap or cover O, as shown in Figs. 1 and 2.

The bulb of the lamp is inclosed in an outer glass, $u$, secured to the cover O by the disk N, as shown in Fig. 3, and a hook, R, constituting a handle to the lamp, is connected to the cover by wires S, which serve as a cage to protect the illuminating portion of the lamp from injury.

Having now particularly described and ascertained the nature of our said invention, and in what manner the same is to be performed, we declare that we do not claim herein the method above described of obtaining revivified negative elements and a revivified electrolyte, reserving the same for a separate application; but

What we claim is—

1. An electric battery having a negative element composed of or carrying peroxide of silver, in combination with a positive element and electrolyte, substantially as described.

2. The combination, with the battery-vessel and electrolyte, of positive elements in said vessel, negative elements all attached to and carried by a disk or plate covering the vessel, and contacts for the positive elements, also carried by said disk or plate, the positive elements not being carried thereby, so that by removing the cover the negative elements may be readily removed for regeneration, leaving the positive elements in the battery-vessel, substantially as described.

3. In a battery, the combination of the containing-vessel divided into compartments, the positive elements of S shape, and the negative elements one in each loop of the positive elements, substantially as described.

In testimony whereof we have signed our names to this specification in the presence of two subscribing witnesses.

DAVID URQUHART.
BENJAMIN NICHOLSON.

Witnesses:
   DOUGLAS J. NEWTON,
      9 *Birchin Lane, London.*
   CHAS. MILLS,
      47 *Lincoln's Inn Fields, London.*